(12) United States Patent
Lai et al.

(10) Patent No.: US 8,692,397 B1
(45) Date of Patent: Apr. 8, 2014

(54) MECHANISM FOR THE CONVERSION OF VERTICAL MOTION TO TRANSLATIONAL OR ROTATIONAL MOTION

(71) Applicant: Secretary of the Navy, China Lake, CA (US)

(72) Inventors: William W. Lai, Ridgecrest, CA (US); Alfred J. Baca, Ridgecrest, CA (US); M. Joseph Roberts, Ridgecrest, CA (US); Lawrence C. Baldwin, Ridgecrest, CA (US); Michael T. Owens, Escondido, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/727,254

(22) Filed: Dec. 26, 2012

Related U.S. Application Data

(63) Continuation-in-part of application No. 13/495,278, filed on Jun. 13, 2012.

(51) Int. Cl.
   *F02B 63/04* (2006.01)
   *F03G 7/08* (2006.01)
   *H02K 7/18* (2006.01)
   *F03B 13/00* (2006.01)
   *H02P 9/04* (2006.01)
   *A43B 13/20* (2006.01)
   *H02K 7/00* (2006.01)

(52) U.S. Cl.
   USPC ........ 290/1 R; 290/54; 36/29; 36/88; 310/17; 310/30

(58) Field of Classification Search
   USPC .............. 290/1 R, 54; 36/29, 88; 310/17, 30
   See application file for complete search history.

(56) References Cited

U.S. PATENT DOCUMENTS

| 5,167,082 | A | * | 12/1992 | Chen | 36/2.6 |
|---|---|---|---|---|---|
| 5,347,186 | A | * | 9/1994 | Konotchick | 310/17 |
| 5,495,682 | A | * | 3/1996 | Chen | 36/2.6 |
| 5,818,132 | A | * | 10/1998 | Konotchick | 310/17 |
| 5,860,727 | A | * | 1/1999 | Chien | 362/84 |
| 5,918,381 | A | * | 7/1999 | Landry | 36/3 B |
| 6,182,378 | B1 | * | 2/2001 | Sendaula | 36/29 |
| 6,201,314 | B1 | | 3/2001 | Landry | 290/54 |
| 6,220,719 | B1 | * | 4/2001 | Vetorino et al. | 362/192 |
| 6,239,501 | B1 | * | 5/2001 | Komarechka | 290/1 R |
| 6,255,799 | B1 | | 7/2001 | Le et al. | 320/107 |
| 6,281,594 | B1 | * | 8/2001 | Sarich | 290/1 R |
| 6,744,145 | B2 | * | 6/2004 | Chang | 290/1 R |
| 6,768,230 | B2 | * | 7/2004 | Cheung et al. | 310/30 |
| 6,798,090 | B2 | * | 9/2004 | Cheung et al. | 310/17 |
| 6,809,427 | B2 | * | 10/2004 | Cheung et al. | 290/1 R |
| 6,812,583 | B2 | * | 11/2004 | Cheung et al. | 290/1 R |
| 6,812,598 | B2 | * | 11/2004 | Cheung et al. | 310/30 |
| 6,861,772 | B2 | * | 3/2005 | Cheung et al. | 310/30 |
| 6,865,825 | B2 | * | 3/2005 | Bailey et al. | 36/88 |
| 6,936,937 | B2 | * | 8/2005 | Tu et al. | 310/12.12 |
| 7,009,310 | B2 | * | 3/2006 | Cheung et al. | 290/1 R |

(Continued)

*Primary Examiner* — Pedro J Cuevas
(74) *Attorney, Agent, or Firm* — James M. Saunders

(57) ABSTRACT

A mechanism for the conversion of vertical motion to translational or rotational motion includes a substrate, at least one permanent magnet, at least one coil of wire, at least one inelastic material, at least one elastic material, and at least one pivot point. The coil of wire is a solenoid.

18 Claims, 4 Drawing Sheets

(56) References Cited

U.S. PATENT DOCUMENTS

| | | | |
|---|---|---|---|
| 7,107,706 B1 * | 9/2006 | Bailey et al. | 36/88 |
| 7,148,583 B1 * | 12/2006 | Shau et al. | 290/1 R |
| 7,204,041 B1 * | 4/2007 | Bailey et al. | 36/29 |
| 7,219,449 B1 * | 5/2007 | Hoffberg et al. | 36/88 |
| 7,288,860 B2 * | 10/2007 | Cheung et al. | 310/12.12 |
| 7,309,934 B2 * | 12/2007 | Tu et al. | 310/12.12 |
| 7,327,046 B2 * | 2/2008 | Biamonte | 290/1 R |
| 7,362,003 B2 * | 4/2008 | Stewart et al. | 290/42 |
| 7,395,614 B1 * | 7/2008 | Bailey et al. | 36/28 |
| 7,431,474 B2 * | 10/2008 | Mah | 362/192 |
| 7,498,682 B2 * | 3/2009 | Lemieux | 290/1 R |
| 7,692,320 B2 * | 4/2010 | Lemieux | 290/1 R |
| RE41,626 E * | 9/2010 | Cheung et al. | 310/30 |
| 7,952,238 B2 * | 5/2011 | Tu et al. | 310/12.24 |
| 7,956,476 B2 | 6/2011 | Yang | 290/1 R |
| 7,989,971 B2 * | 8/2011 | Lemieux | 290/1 R |
| 2003/0155771 A1 * | 8/2003 | Cheung et al. | 290/1 R |
| 2003/0197433 A1 * | 10/2003 | Cheung et al. | 310/14 |
| 2004/0155467 A1 * | 8/2004 | Cheung et al. | 290/1 R |
| 2012/0260522 A1 * | 10/2012 | Shi et al. | 36/2.6 |
| 2012/0260531 A1 * | 10/2012 | Shi et al. | 36/102 |
| 2013/0033042 A1 * | 2/2013 | Fortier et al. | 290/54 |

* cited by examiner

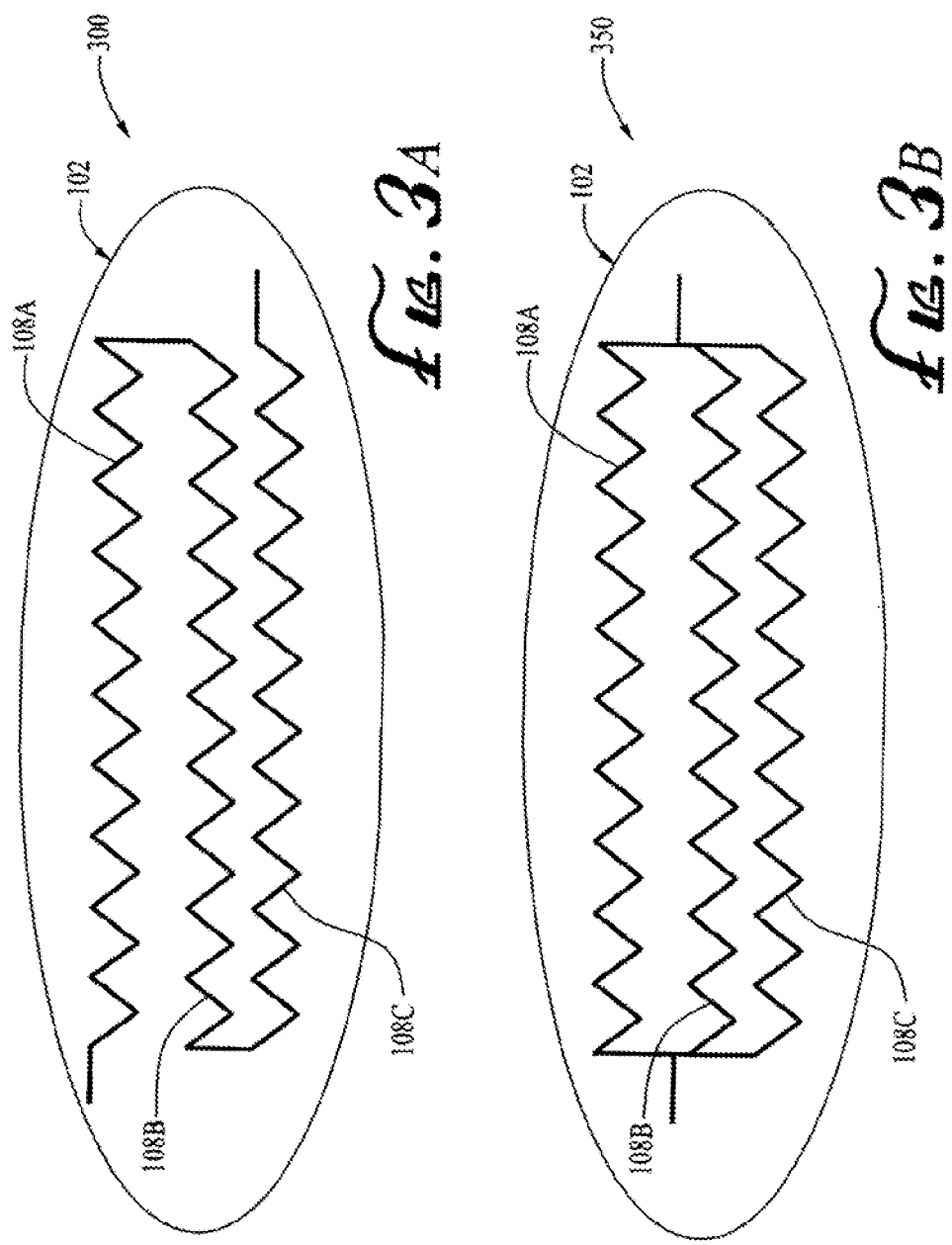

MECHANISM FOR THE CONVERSION OF VERTICAL MOTION TO TRANSLATIONAL OR ROTATIONAL MOTION

CROSS-REFERENCE TO RELATED APPLICATIONS

This is a continuation-in-part application, claiming the benefit of parent non-provisional application Ser. No. 13/495,278 filed on Jun. 13, 2012, whereby the entire disclosure of which is incorporated hereby reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to energy harvesting, and more particularly, to a footwear apparatus for harvesting magnetic and electrical energy by converting vertical motion to translational or rotational motion.

BRIEF DESCRIPTION OF THE DRAWINGS

FIG. 3A is a plan view of a hybrid system for harvesting magnetic and electrical energy with solenoids connected in series, according to embodiments of the invention.

FIG. 3B is a plan view of a hybrid system for harvesting magnetic and electrical energy with solenoids connected in parallel, according to embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

The invention generally relates to energy harvesting, and more particularly, to a footwear apparatus for harvesting magnetic and electrical energy by converting vertical motion to translational or rotational motion. The average person takes between five and seven thousand steps each day. The ability to harvest energy from each step, however small, can result in a substantial total daily value. In turn, this can then be readily applied to personal communications equipment and other devices having low energy requirements.

There have been many attempts to harvest the energy resulting from compression and decompression of heel strikes. Although this is an emerging technology, the amount of energy collected is severely limited by the displacement of the compression/decompression distance. When incorporated into a shoe, this would result in a displacement range between five and ten cm. Any more than that would result in an abnormal change in the normal gait of a person. The result of which would offset any additional energy collection by increased fatigue or abnormal wear and tear on joints.

The limitations of energy harvesting by mechanical means can be avoided by using a system that can multiply the effects of each small displacement. Harvesting energy by way of magnetic induction is one such way of multiplying the effective distance that is displaced with each step. Another benefit of using magnetic induction for energy harvesting is the device can make use of both moving and non-moving parts of a shoe, which allows the entire sole to be used as an energy harvester.

Although embodiments of the invention are described in considerable detail, including references to certain versions thereof, other versions are possible. Examples of other versions include performing alternate combinations and sequencing of the materials to enhance energy harvesting based on application-specific conditions. Therefore, the spirit and scope of the appended claims should not be limited to the description of versions included herein.

Figure 1:
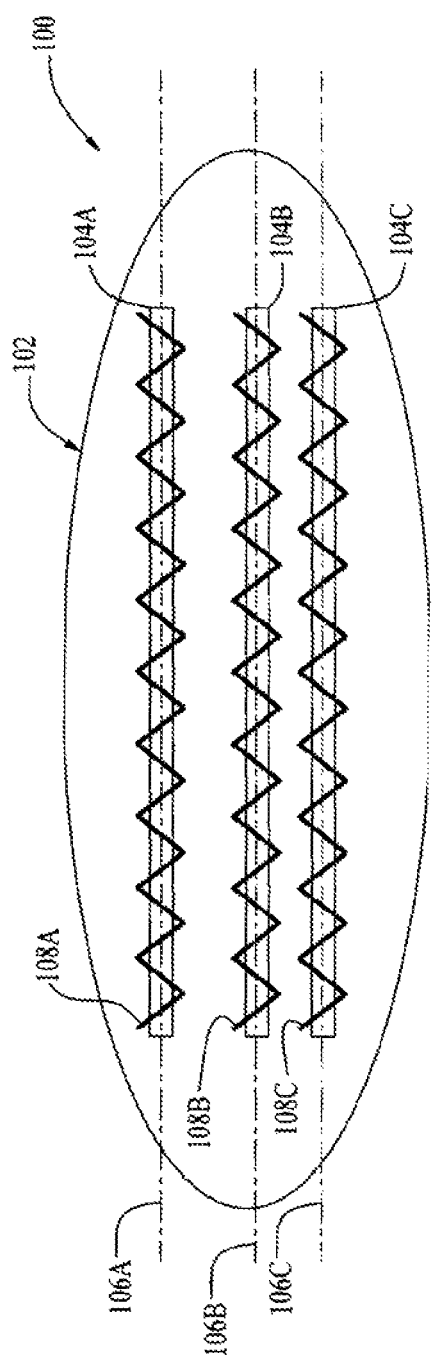
FIG. 1 is a plan view of a hybrid system for harvesting magnetic and electrical energy, according to embodiments of the invention.
Figure 2A:
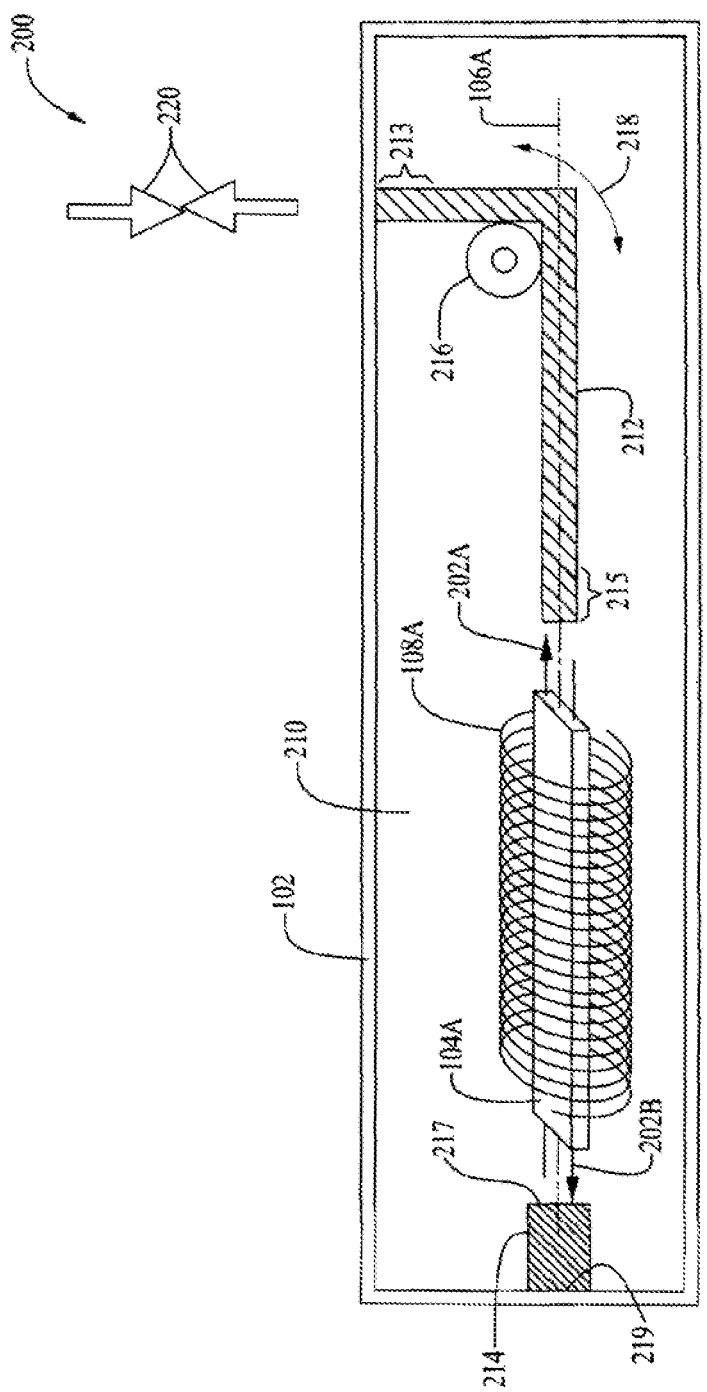
FIG. 2A is a partial elevation/perspective view of a mechanism to convert vertical motion to translational motion, according to embodiments of the invention.

In the accompanying drawings, like reference numbers indicate like elements. FIG. 1 illustrates a plan view of a hybrid system for harvesting magnetic and electrical energy, according to embodiments of the invention. Reference character 100 depicts an apparatus of embodiments of the invention. FIG. 2A illustrates a partial elevation/perspective view of a mechanism to convert vertical motion to translational motion, according to embodiments of the invention, and is depicted as reference character 200. Components may exist singularly or in pluralities, even though depicted as one or the other in the figures for simplified viewing, without detracting from the merits or generality of embodiments of the invention.

Referring simultaneously to FIGS. 1 and 2A, embodiments of the invention generally relate to an energy harvesting device for converting vertical motion to translational motion in footwear, including a substrate 102 having at least one interior compartment 210 (FIG. 2A). At least one permanent magnet 104A, B, and C is configured to fit in the interior compartment 210 (FIG. 2A). Each permanent magnet 104A, B, and C has a central longitudinal axis 106A, B, and C.

At least one coil of wire 108A, B, and C equal in number to the permanent magnets 104A, B, and C is provided. Each coil of wire 108A, B, and C is configured to fit circumferentially around each permanent magnet 104A, B, and C. Each coil of wire 108A, B, and C is configured to fit in the interior compartment 210 (FIG. 2A).

Referring to FIG. 2A, at least one inelastic material 212 is provided. For ease of viewing, components are shown in unattached form. The inelastic material 212 has a first end 213 attached to the substrate 102 and a second end 215 attached to the permanent magnets 104A, B, and C. The inelastic material 212 is configured to compress and decompress. At least one elastic material 214 is provided. The elastic material 214 has a first end 217 attached to the permanent magnet 104A, B, and C and a second end 219 attached to the substrate 102. Any appropriate attachment mechanism may be used that does not interfere with magnetic induction. Thus, for example, the inelastic and elastic materials 212 and 214 may be attached to the permanent magnet 104A, B, and C and the substrate 102 by glue.

At least one pivot point 216 is provided. The pivot point 216 is attached to the substrate 102. Appropriate attachment mechanisms that do not interfere with magnetic induction are used. These include, but are not limited to, brackets, hinges, bolts, screws, and glue. The pivot point 216 is juxtaposed against the inelastic material 212 and is configured to axially rotate when a compressive heel strike force 220 is applied to and released from the substrate 102.

The permanent magnet 108A, B, and C is configured to move laterally back and forth along the central longitudinal axis 106A, B, and C when a compressive heel strike force 220 is applied to and released from the substrate 102. The elastic material 214 compresses and then decompresses with the compressive heel strike force 220. The decompressing action of the elastic material 214 drives the permanent magnet in the opposite direction (for example movement 202A in FIG. 2A).

The inelastic material 212 can be artificial or natural materials such as, for example, nylon or hemp. The elastic material 214 has a modulus of elasticity range of about $10 \times 10^6$ to $100 \times 10^9$ Pascal. Some examples of the elastic material 214 include, but are not limited to, rubber, Teflon®, and polyethylene. The inelastic and elastic materials 212 and 214 are depicted in FIG. 2A with two different hatching patterns for illustrative purposes of depicting that the two structures are different materials. The pivot point 216 is at least one pulley. Example materials for the pulley 216 include, but are not limited to plastics, composites, and rubber. Composite examples include ceramic composites.

Figure 2B:
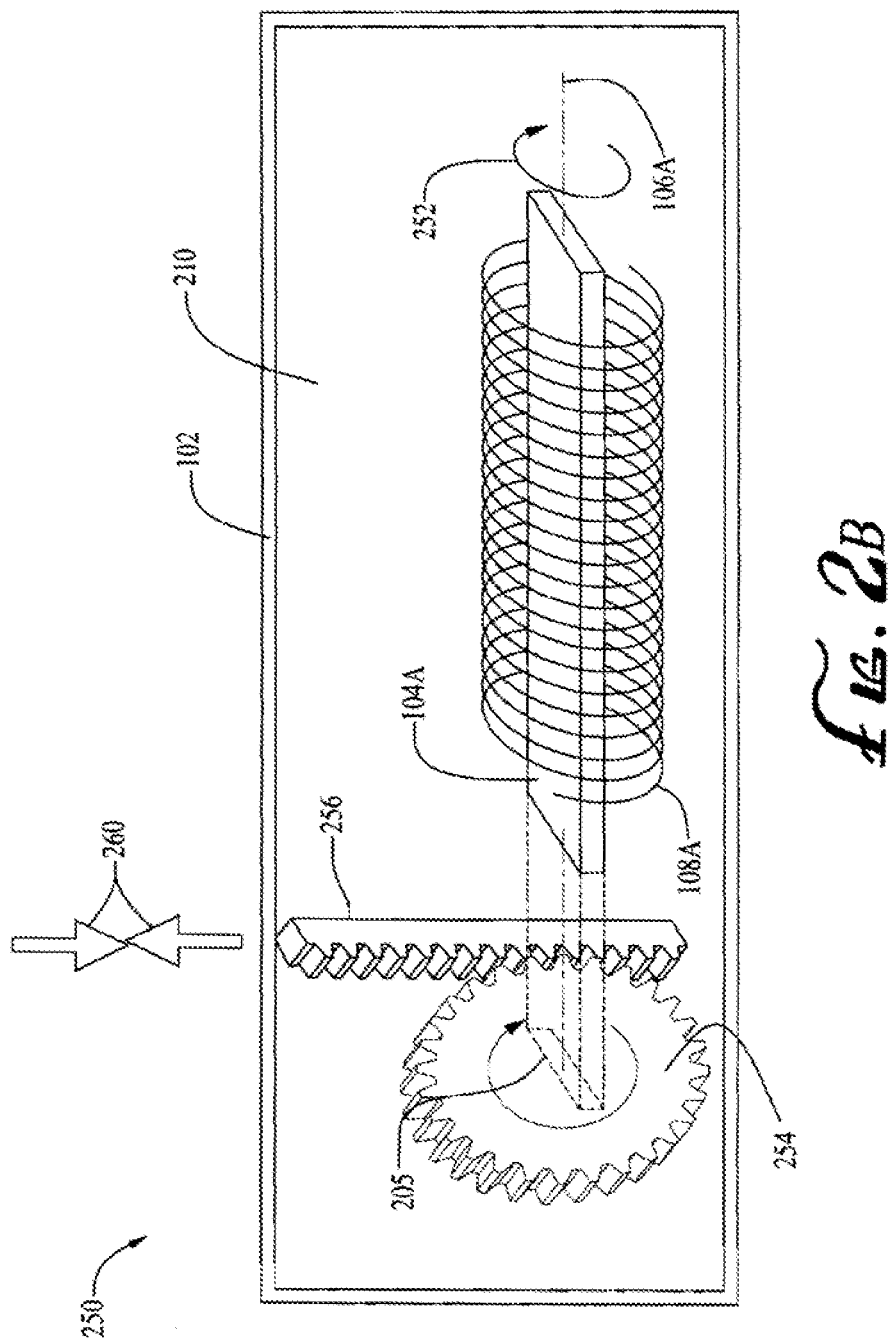
FIG. 2B is a partial elevation/perspective view of a mechanism to convert vertical motion to rotational motion, according to embodiments of the invention.

FIG. 2B illustrates a partial elevation/perspective view of a mechanism to convert vertical motion to rotational motion, according to embodiments of the invention, and is depicted as reference character 250. Referring simultaneously to FIGS. 1 and 2B, another embodiment of the invention generally relates to an energy harvesting device for converting vertical motion to rotational motion in footwear, including a substrate 102 having at least one interior compartment 210 (FIG. 2B). At least one permanent magnet 104A, B, and C is configured to fit in the interior compartment 210 (FIG. 2B). Each permanent magnet 104A, B, and C has a central longitudinal axis 106A, B, and C.

At least one coil of wire 108A, B, and C equal in number to the permanent magnets 104A, B, and C is provided. Each coil of wire 108A, B, and C is configured to fit circumferentially around each permanent magnet 104A, B, and C. Each coil of wire 104A, B, and C is configured to fit in the interior compartment 210 (FIG. 2B).

Referring to FIG. 2B, at least one circular gear 254 is provided. The circular gear 254 is attached to the distal end 205 of the permanent magnet 104A, B, and C. At least one linear gear 256 is juxtaposed next to the circular gear 254. The linear gear 256 is configured to engage the circular gear 254 when a compressive heel strike force 260 is applied to and released from the substrate 102. This occurs because the linear gear 256 is attached to the substrate 102. For ease of viewing, a portion of the permanent magnet 104A, B, and C such as, for example, the distal end 205 is shown with hidden lines for ease of viewing the connection with the circular gear 254 and to not obstruct the linear gear 256.

Each permanent magnet 104A, B, and C is configured to rotationally spin back and forth about the central longitudinal axis 106A, B, and C when a compressive heel strike force 260 is applied to and released from the substrate 102. The rotational spin is depicted as reference character 252. A bar or screw (not shown) may span the length of the permanent magnet 104A, B, and C connecting the permanent magnet 104A and circular gear 254 to the substrate 102 such as, for example, through the central longitudinal axis 106A, B, and C.

In some embodiments, the interior compartment 210 (FIGS. 2A and 2B) is a void, while in other embodiments the interior compartment may be partially filled with a compressible material to aid in a wearer's comfort such as, for example, foam. The substrate 102 is configured to fit within the confines of a shoe. In other embodiments, the substrate 102 is configured to removably fit within the confines of a shoe.

The coil of wire 108A, B, and C is at least one solenoid attached to the substrate 102. The coil of wire 108A, B, and C may be attached on any side of the substrate 102 and by an appropriate attachment mechanism such as, for example, brackets, glue, and screws. In some embodiments, the coil of wire 108A, B, and C is connected in series (FIG. 3B) to increase voltage output. In other embodiments, the coil of wire 108A, B, and C is connected in parallel (FIG. 3B) to increase current output. The inelastic and elastic materials 212 and 214 are presented in FIG. 2A in a simplified format with different hatch patterns to depict different materials and, as such, are representative only and are not to be construed as limiting.

FIG. 3A is a plan view of a hybrid system for harvesting magnetic and electrical energy with solenoids connected in series, according to embodiments of the invention and is depicted as reference character 300. FIG. 3B is a plan view of a hybrid system for harvesting magnetic and electrical energy with solenoids connected in parallel, according to embodiments of the invention and is depicted as reference character 350. For ease of viewing specific component orientations and connections, permanent magnets 104A, B, and C (shown in FIG. 1) and central longitudinal axes 106A, B, and C (shown in FIG. 1) are not shown in FIG. 3A or 3B.

Referring simultaneously to FIGS. 1 through 3B, embodiments of the invention can take several formats. In embodiments, the substrate 102 is an insole of a shoe. The substrate 102 may also be a sole or part of a sole of a shoe, including the heel portion. A person having ordinary skill in the art will recognize that an insole is sometimes referred to as an insert.

In embodiments, the substrate 102 may also be referred to as a platform without detracting from the merits or generality of embodiments of the invention. The substrate 102 exhibits appropriate rigidity necessary for a user's shoe/boot. A person having ordinary skill in the art will recognize that the term permanent magnet is a material exhibiting a persistent magnetic field even without the application of external energy. Harvested energy can be stored in devices capable of storing electrical charge such as, for example, batteries and capacitors.

Lateral movement corresponds to alternating current (AC) power. An example of lateral movement includes back 202A and forth 202B (FIG. 2A) movement during compression (downward force applied) and decompression (removal of the force), respectively and shown as reference character 220 in FIG. 2A.

FIG. 2B depicts rotational spin 252 about the central longitudinal axis 106A associated with permanent magnet 104A. Rotational spin corresponds to direct current (DC) power. A rotational spin example would include clockwise rotation during compression and counterclockwise rotation during decompression, shown as reference character 260 in FIG. 2B.

Since magnetic fields are additive, the magnetic field is maximized when all magnets 104A, B, and C move laterally or rotate. Although, embodiments of the invention do allow for some magnets to move laterally and others to rotate.

However, independent systems such as, for example, an alternator are needed in such cases.

The solenoids 108A, B, and C can span the entire length of the substrate 102. A reason for this not to occur is to allow room for a mechanism that would allow for the magnets 104A, B, and C to move either laterally or rotationally, depending on the particular operating environment. Additionally, the span of the solenoids 108A, B, and C can be limited in cases where all the energy generation is localized in the heel.

In embodiments, the magnets 104A, B, and C are selected from the group of rare earth elements such as, for example, neodymium and europium. The solenoids 108A, B, and C are conductive materials having a zero or low energy band gap between valence and conduction bands. Metals and metal oxides are suitable materials having a zero energy band gap (0 eV). Semiconductors are suitable materials having a low energy band gap, defined as greater than 0 eV and less than 1.2 eV. Band gap energy closer to 0 eV results in less charge loss. Since the power generation/output is proportional to the density of the coil 108A, B, and C and strength of the permanent magnet 104A, B, and C, the solenoid/magnet placement/number can be such that the maximum allowable space of the substrate 102 (sole/insert) is filled.

The solenoids 108A, B, and C are a succession of tightly wound coils of wires. Within these coils 108A, B, and C and along the central longitudinal axis 106A, B, and C is where the permanent magnet 104A, B, and C resides. A person having ordinary skill in the art will recognize that, according to the Right Hand rule, current is generated whenever there is a change in the magnetic field within the solenoid 108A, B, and C so either or both parts (magnet 104A, B, and C/solenoid 108A, B, and C) can move. In practice, it is more feasible for the solenoid 108A, B, and C to be the stationary component and the magnet 104A, B, and C to be the mobile component. Because of the perturbation of the magnetic field, any movement, either laterally or rotationally will induce a current.

Depending on application specific conditions and power requirements, the solenoids 108A, B, and C can either be interconnected in a series or parallel. Changing the configuration allows for the increase of either voltage or current output, depending on the application. The energy to drive the magnet's rotation is provided by the force exerted by a heel step. Vertical displacements can be readily converted to rotational energy. By varying the number of rotations per distance unit, each heel step can translate to dozens of rotations along the screw axis.

One having ordinary skill in the art will recognize that embodiments of the invention can be used with a shoe, boot, slipper, or any durable apparel item fitted to a human foot, without detracting from the merits or generality of embodiments of the invention. Furthermore, the concepts embodied herein are equally applicable to other species that can make use of durable wear items fitted to their feet. Further research includes, but is not limited to, identifying alternative mechanisms for the translational and rotational movement of the magnets 104A, B, and C.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A energy harvesting device for converting vertical motion to translational motion in footwear, comprising:
   a substrate having at least one interior compartment;
   at least one permanent magnet configured to fit in said at least one interior compartment, wherein each of said at least one permanent magnet has a central longitudinal axis;
   at least one coil of wire equal in number to said at least one permanent magnet, wherein each of said at least one coil of wire is configured to fit circumferentially around each of said at least one permanent magnet, wherein each of said at least one coil of wire is configured to fit in said at least one interior compartment;
   at least one inelastic material having a first end attached to said substrate and a second end attached to said at least one permanent magnet;
   at least one elastic material having a first end attached to said at least one permanent magnet and a second end attached to said substrate, wherein said at least one elastic material is configured to compress and decompress; and
   at least one pivot point attached to said substrate, wherein said at least one pivot point is juxtaposed against said at least one inelastic material, wherein said at least one pivot point is configured to axially rotate when a compressive heel strike force is applied to and released from said substrate.

2. The device according to claim 1, wherein said at least one interior compartment is a void.

3. The device according to claim 1, wherein said substrate is configured to fit within the confines of a shoe.

4. The device according to claim 1, wherein said substrate is configured to removably fit within the confines of a shoe.

5. The device according to claim 1, wherein said at least one coil of wire is at least one solenoid attached to said substrate.

6. The device according to claim 1, wherein said at least one coil of wire is connected in series to increase voltage output.

7. The device according to claim 1, wherein said at least one coil of wire is connected in parallel to increase current output.

8. The device according to claim 1, wherein said at least one permanent magnet is configured to move laterally back and forth along said central longitudinal axis when a compressive heel strike force is applied to and released from said substrate.

9. The device according to claim 1, wherein said at least one elastic material has a modulus of elasticity range of about $10 \times 10^6$ to $100 \times 10^9$ Pascal.

10. The device according to claim 1, wherein each of said at least one pivot point is at least one pulley selected from the group of materials consisting of plastics, composites, and rubber.

11. An energy harvesting device for converting vertical motion to rotational motion in footwear, comprising:
   a substrate having at least one interior compartment;
   at least one permanent magnet configured to fit in said at least one interior compartment, wherein each of said at least one permanent magnet has a central longitudinal axis;
   at least one coil of wire equal in number to said at least one permanent magnet, wherein each of said at least one coil of wire is configured to fit circumferentially around each of said at least one permanent magnet, wherein each of said at least one coil of wire is configured to fit in said at least one interior compartment;
   at least one circular gear attached to the distal end of each of said at least one permanent magnet; and
   at least one linear gear juxtaposed to said at least one circular gear, wherein said at least one linear gear is configured to engage said at least one circular gear when a compressive heel strike force is applied to and released from said substrate.

12. The device according to claim 11, wherein said at least one interior compartment is a void.

13. The device according to claim 11, wherein said substrate is configured to fit within the confines of a shoe.

14. The device according to claim 11, wherein said substrate is configured to removably fit inside the confines of a shoe.

15. The device according to claim 11, wherein said at least one coil of wire is at least one solenoid attached to said substrate.

16. The device according to claim 11, wherein said at least one coil of wire is connected in series to increase voltage output.

17. The device according to claim 11, wherein said at least one coil of wire is connected in parallel to increase current output.

18. The device according to claim 11, wherein said at least one permanent magnet is configured to rotationally spin back and forth about said central longitudinal axis when a compressive heel strike force is applied to and released from said substrate.

* * * * *